(12) United States Patent
Yokoi (10) Patent No.: US 8,401,408 B2
(45) Date of Patent: Mar. 19, 2013

(54) LIGHT SCANNING DEVICE AND IMAGE FORMING APPARATUS INCLUDING A CONTROLLER THAT DETERMINES A SCANNING DIRECTION OF LIGHT BEAM

(75) Inventor: Junichi Yokoi, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1210 days.

(21) Appl. No.: 12/237,637

(22) Filed: Sep. 25, 2008

(65) Prior Publication Data

US 2009/0080039 A1 Mar. 26, 2009

(30) Foreign Application Priority Data

Sep. 25, 2007 (JP) ................................ 2007-247608

(51) Int. Cl.
*H04N 1/04* (2006.01)
(52) U.S. Cl. ........ 399/47; 358/1.12; 358/1.18; 358/488; 358/497; 399/376
(58) Field of Classification Search .................. 358/1.12, 358/1.18; 399/47, 376
See application file for complete search history.

(56) References Cited

U.S. PATENT DOCUMENTS

| | | | | |
|---|---|---|---|---|
| 3,301,126 A | * | 1/1967 | Osborne et al. | 399/16 |
| 4,201,994 A | * | 5/1980 | Hoshito et al. | 347/246 |
| 4,568,181 A | * | 2/1986 | Nishiyama | 355/75 |
| 5,252,991 A | * | 10/1993 | Storlie et al. | 347/262 |
| 2005/0023490 A1 | * | 2/2005 | Cottles et al. | 250/559.36 |

FOREIGN PATENT DOCUMENTS

| | | |
|---|---|---|
| JP | 9-230276 A | 9/1997 |
| JP | 09-230278 | 9/1997 |
| JP | 2004-230629 A | 8/2004 |
| JP | 2006-035551 A | 2/2006 |

OTHER PUBLICATIONS

JP Office Action dtd Sep. 1, 2009, JP Appln. 2007-247608, partial English Translation.

* cited by examiner

*Primary Examiner* — David K Moore
*Assistant Examiner* — Peter K Huntsinger
(74) *Attorney, Agent, or Firm* — Banner & Witcoff, Ltd.

(57) ABSTRACT

A light scanning device and an image forming apparatus including the light scanning device are provided. The light scanning device includes: a light emitting unit which emits a light beam; a light deflecting unit which deflects the light beam to scan in a scanning direction; a scanning lens which focuses the light beam deflected and scanned by the light deflecting unit on a photosensitive body; and a light detecting unit which detects the light beam directed to outside areas of an image formation area in the scanning direction, wherein an optical path length of the light beam directed to one of the outside areas, from the light deflecting unit to the light detecting unit is different from an optical path length of the light beam directed to the other one of the outside areas, from the light deflecting unit to the light detecting unit.

3 Claims, 6 Drawing Sheets

LIGHT SCANNING DEVICE AND IMAGE FORMING APPARATUS INCLUDING A CONTROLLER THAT DETERMINES A SCANNING DIRECTION OF LIGHT BEAM

CROSS-REFERENCE TO RELATED APPLICATION

This application claims priority from Japanese Patent Application No. 2007-247608, filed on Sep. 25, 2007, the entire subject matter of which is incorporated herein by reference.

TECHNICAL FIELD

Aspects of the present invention relate to a light scanning device and an image forming apparatus.

BACKGROUND

Generally, in a light scanning device having a galvanometer mirror as light deflection means, it is necessary to detect a light beam outside an electrostatic latent image formation area on a photosensitive body, for example, near an end portion of the light scanning surface on the photosensitive body in order to control an oscillation angle of the mirror or control a write start position of an electrostatic latent image (picture image) on the photosensitive body. Therefore, JP-A-H9-230278 describes a light scanning device including a detection sensor for detecting the light beam at a position corresponding to each of a scan start position and a scan end position on the photosensitive drum.

In the above-described light scanning device, each detection sensor is disposed such that an optical path length from each detection sensor to the galvanometer mirror is equal to each other. A light beam is reflected from a reflection mirror of the galvanometer mirror to pass through a scanning lens, and then led to the detection sensor. In this path, the light beam is converted to allow a constant speed scanning on the photosensitive drum (light scanning surface) when passing through the scanning lens.

If the optical path length from each detection sensor to the galvanometer mirror is equal to each other, the speed (time) at which the light beam passes through the detection position of each detection sensor is equal, so that the signal obtained by each detection sensor, which usually can not determine the scanning direction but has the same electric characteristics, is equal. In this case, the scanning direction of the light beam can not be determined. This is disadvantage is remarkable especially in the case where the signal is inputted from a single input unit into a control system for controlling light deflection means, that is, only one detection sensor is provided, or where only one input unit of the signal is provided for a plurality of detection sensors.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a light scanning device which can distinguish the signal outputted from light detection means and an image forming apparatus including the light scanning device.

According to an exemplary embodiment of the present invention, there is provided a light scanning device for forming an electrostatic latent image in an image formation area on a photosensitive body. The light scanning device includes: a light emitting unit which emits a light beam; a light deflecting unit which deflects the light beam to scan in a scanning direction; a scanning lens which focuses the light beam deflected and scanned by the light deflecting unit on the photosensitive body; and a light detecting unit which detects the light beam directed to outside areas of the image formation area in the scanning direction. An optical path length of the light beam directed to one of the outside areas, from the light deflecting unit to the light detecting unit is different from an optical path length of the light beam directed to the other one of the outside areas, from the light deflecting unit to the light detecting unit.

According to another exemplary embodiment, there is provided an image forming apparatus including: the light scanning device as described above; the photosensitive body on which the electrostatic latent image is formed with the light beam scanned by the light scanning device; a developing unit which supplies developer to the electrostatic latent image to form a developer image; a transfer unit which transfers the developer image onto a recording sheet; and a fixing unit which fixes the developer image transferred onto the recording sheet.

According to a further exemplary embodiment of the present invention, there is provided a light scanning device including: a light emitting unit which emits a light beam; an oscillating mirror which deflects the light beam to reciprocate in a scanning direction; a lens which focuses the light beam deflected by the oscillating mirror on an object and allows the light beam to scan over a scanned region on the object at a constant speed, the scanned region including a first area, a second area and a third area in order in the scanning direction; a first light detecting unit which detects the light beam directed to the first area through a first optical path; a second light detecting unit which detects the light beam directed to the third area through a second optical path, wherein a length of the first optical path from the oscillating mirror to the first light detecting unit is different from a length of the second optical path from the oscillating mirror to the second light detecting unit; and a controller including an input unit to which output signals from the first light detecting unit and the second light detecting unit are input while the output signals are unified and configured to determine by which one of the first light detecting unit and the second light detecting unit the light beam is detected when the first light detecting unit or the second light detecting unit detects the light beam.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

First Exemplary Embodiment

A first exemplary embodiment of the present invention will be described in detail with reference to the drawings. In the drawings, FIG. 1 is a cross-sectional view showing the overall configuration of a laser printer 1.

In the following description, the direction is on the basis of the user when using the laser printer 1. That is, it is supposed that the right side of the laser printer 1 as shown in FIG. 1 is "front", the left side is "back", the back side of the drawing sheet is "right", and the front side of the drawing sheet is "left". The vertical direction is as illustrated since the illustrated direction corresponds to the direction of the user when using the laser printer.

Figure 1:
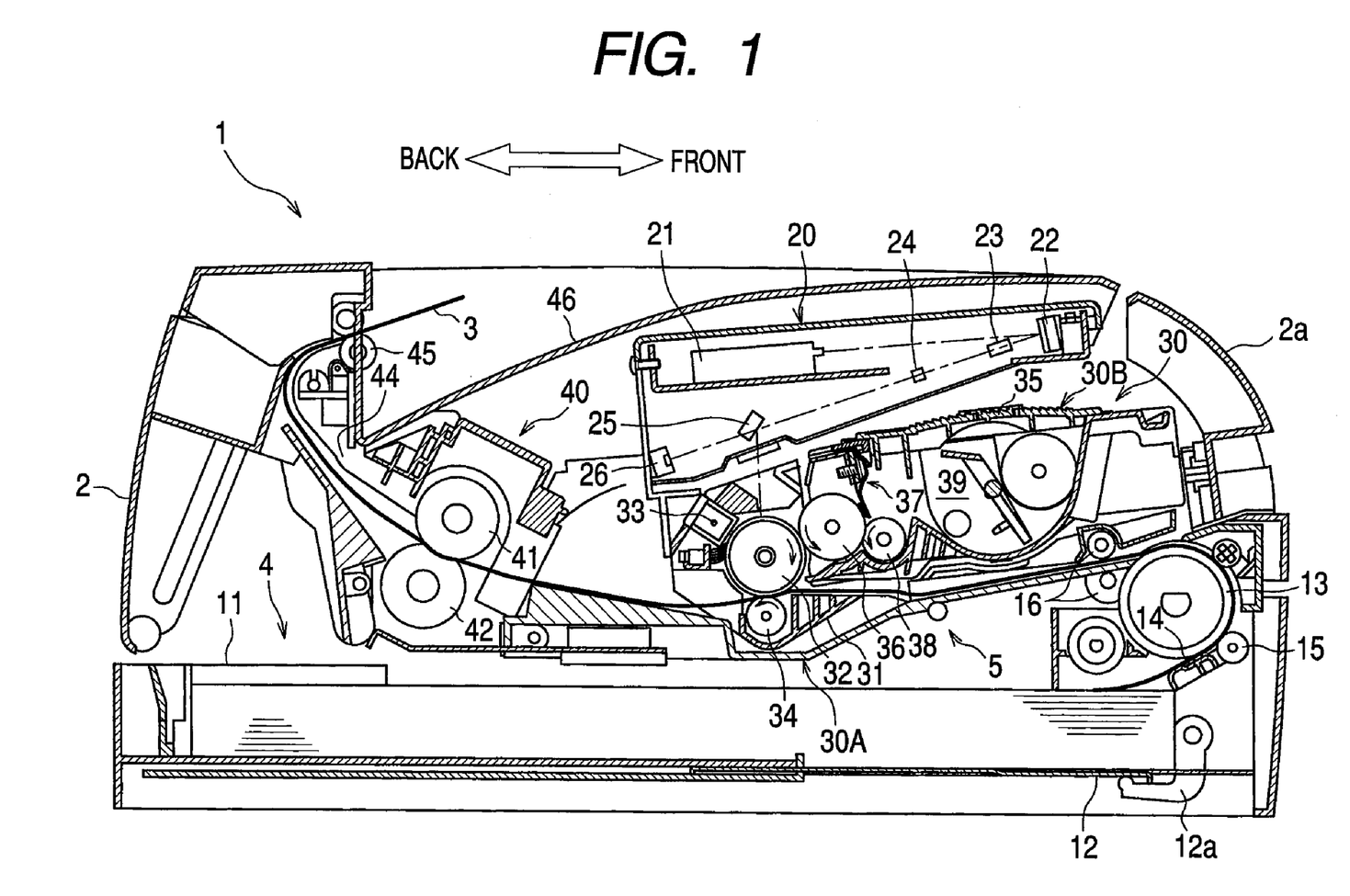
FIG. 1 is a cross-sectional view showing the overall configuration of a laser printer according to an exemplary embodiment of the present invention.

The laser printer 1 includes a sheet feeding unit 4 which feeds a sheet 3 and an image forming unit 5 which forms an image on the fed sheet 3 within a main body 2, as shown in FIG. 1. A front cover 2a which can be freely opened or closed is provided on the front side of the main body 2, and a process cartridge 30 can be mounted or removed through an opening which is made when the front cover 2a is opened.

The sheet feeding unit 4 includes a sheet feed tray 11 removably mounted on the lower part of the main body 2, a sheet pressing plate 12 provided on the lower part of the sheet feed tray 11 to be able to oscillate on the front side, and a lift lever 12a for lifting the sheet pressing plate 12 from the under side. Also, the sheet feeding unit 4 includes a sheet feed roller 13 and a sheet feed pad 14 on the upper front side of the sheet feed tray 11 and a pinch roller 15 opposed to the sheet feed roller 13. Further, the sheet feeding unit 4 includes a registration roller 16 on the upper back side of the sheet feed roller 13.

In the sheet feeding unit 4, the sheet 3 within the sheet feed tray 11 is lifted up by the lift lever 12a and the sheet pressing plate 12, brought to the side of the sheet feed roller 13, fed out by the sheet feed roller 13 and the sheet feed pad 14, passed through various rollers 13, 15 and 16, and conveyed one by one to the image forming unit 5.

The image forming unit 5 includes a light scanning device 20, the process cartridge 30 and a fixing unit 40.

The light scanning device 20 is provided on the upper part of the main body 2, and includes a laser unit 21, a galvanometer mirror 22, the scanning lenses 23 and 24, and a reflection mirror 25. A laser beam (light beam) based on image data emitted from the laser unit 21 is reflected by the galvanometer mirror 22 to pass through the scanning lenses 23 and 24, reflected from the reflection mirror 25, and applied by fast scanning on a photosensitive drum 32 of the process cartridge 30, as indicated by the chain line.

The process cartridge 30 is disposed under the light scanning device 20, and includes a drum cartridge 30A supporting the photosensitive drum 32 as one example of the photosensitive body, and a developing cartridge 30B which is removably mounted on the drum cartridge 30A.

The drum cartridge 30A includes the photosensitive drum 32, a scorotron type charger unit 33 and a transfer roller 34 within a drum frame 31 as an outer frame.

The photosensitive drum 32 is rotatably supported on the drum frame 31. The photosensitive drum 32 has a drum main body, which is grounded, and a surface portion formed of a positive charged photosensitive layer.

The scorotron type charger unit 33 is disposed above the photosensitive drum 32 oppositely with a predetermined gap not to contact the photosensitive drum 32. The scorotron type charger unit 33 positively charges the surface of the photosensitive drum 32 uniformly.

The transfer roller 34 is disposed under the photosensitive drum 32 oppositely to contact the photosensitive drum 32, and rotatably supported on the drum frame 31. A transfer bias is applied to the transfer roller 34 under the constant current control during transfer.

The developing cartridge 30B includes a developing roller 36, a layer thickness regulation blade 37, a supply roller 38 and a toner containing chamber 39 for containing the toner within a developing frame 35 as an outer frame. Among these, the developing roller 36 and the supply roller 38 are rotatably supported on the developing frame 35. The toner within the toner containing chamber 39 is supplied to the developing roller 36 along with the rotation of the supply roller 38. At this time, the toner is positively charged due to friction between the supply roller 38 and the developing roller 36. The toner supplied onto the developing roller 36 enters between the layer thickness regulation blade 37 and the developing roller 36, along with the rotation of the developing roller 36. The toner in a thin layer of constant thickness is carried on the developing roller 36.

The photosensitive drum 32 is positively charged on the surface uniformly by the scorotron type charger unit 33, and then exposed by fast scanning of the laser beam from the light scanning device 20 to form an electrostatic latent image based on image data. The toner carried on the developing roller 36 is supplied to the electrostatic latent image formed on the photosensitive drum 32 while the photosensitive drum 32 contacts the developing roller 36 and rotates along with the rotation of the developing roller 36. The toner is selectively carried on the photosensitive drum 32 and visualized to form a toner image by this reversal development. Thereafter, the sheet 3 is held and conveyed between the photosensitive drum 32 and the transfer roller 34, so that the toner image on the photosensitive drum 32 is transferred onto the sheet 3.

The fixing unit 40 is disposed on the back side of the process cartridge 30, and includes a heating roller 41 and a pressing roller 42 opposed to the heating roller 41. The sheet 3 is held between the heating roller 41 and the pressing roller 42. In the fixing unit 40, the toner image transferred onto the sheet 3 is thermally fixed, while the sheet passes between the heating roller 41 and the pressing roller 42, and the sheet 3 is conveyed onto a sheet discharging path 44.

Next, the detailed configuration of the light scanning device 20 will be described below. In the drawings, FIG. 2 is a plan view showing the configuration of the light scanning device, and FIG. 3 is a view for explaining the position at which the light sensor is disposed.

Figure 2:
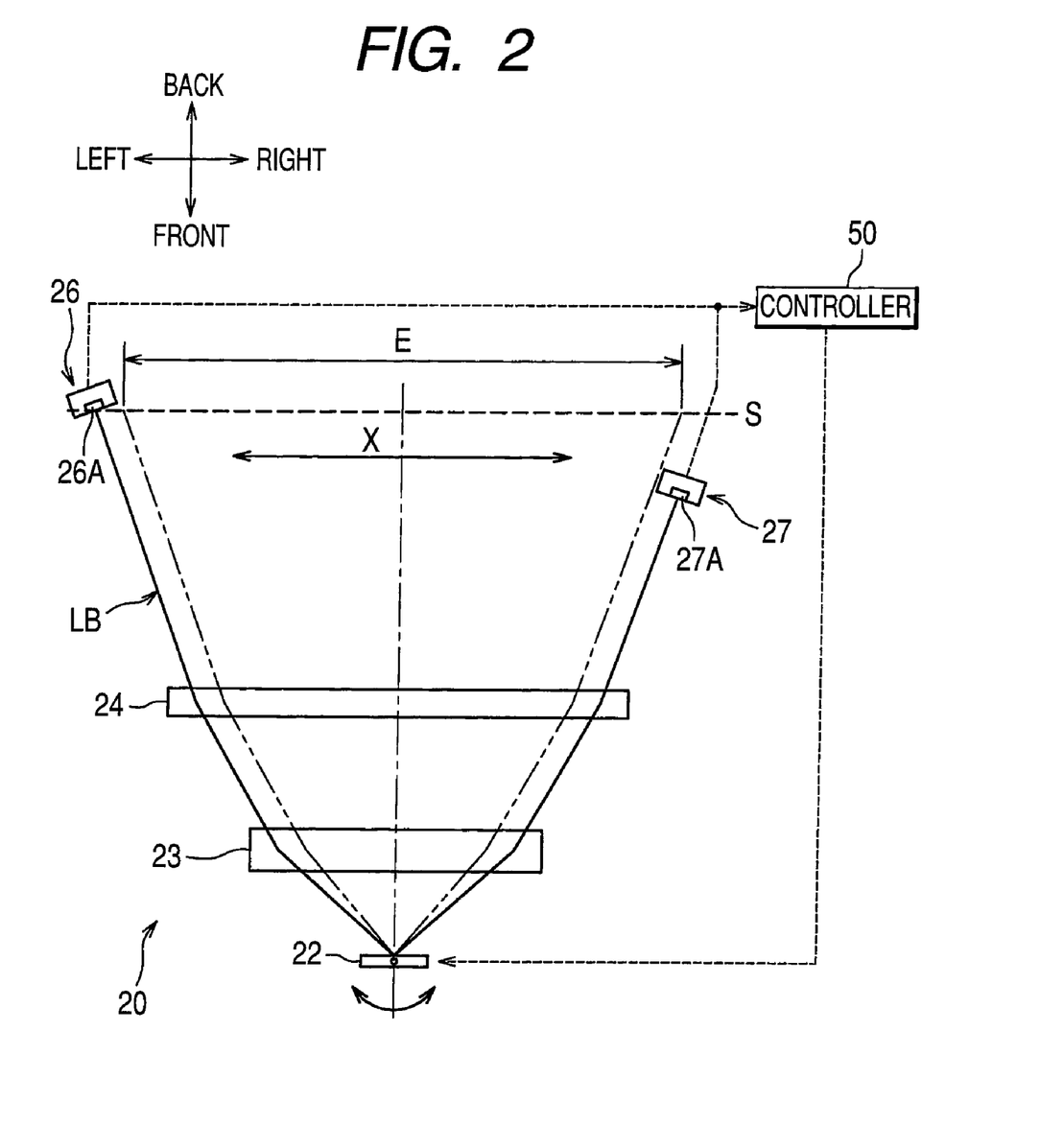
FIG. 2 is a plan view showing the configuration of a light scanning device according to a first exemplary embodiment.
Figure 3:
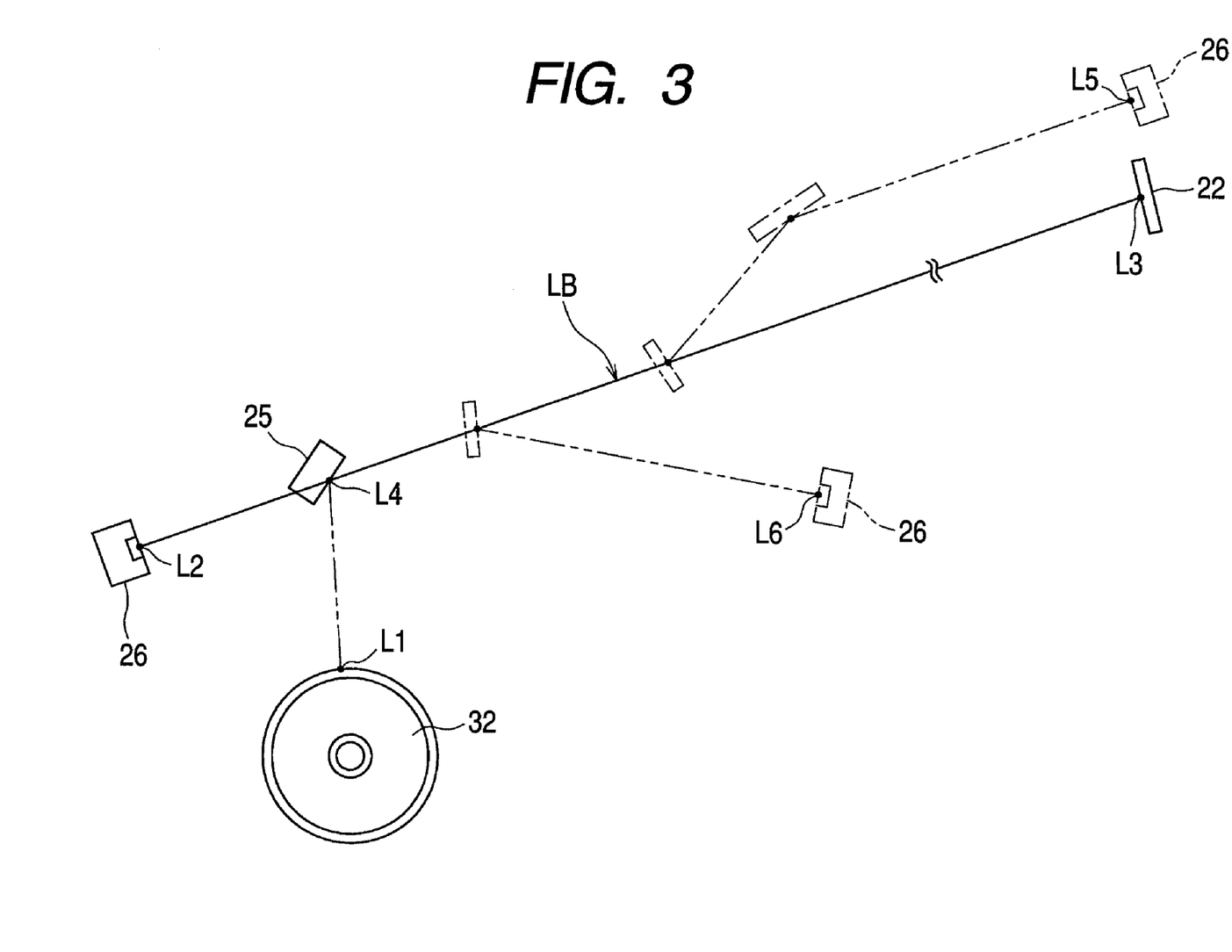
FIG. 3 is a view for explaining a position at which the light sensor is disposed.

The light scanning device 20 includes a first light sensor 26 and a second light sensor 27, in addition to the laser unit 21, the galvanometer mirror 22, the scanning lenses 23 and 24, and the reflection mirror 25, as shown in FIGS. 1 and 2.

The laser unit 21 includes a semiconductor laser and a collimate lens (not shown). In the laser unit 21, the laser beam emitted from the semiconductor laser is collected by the collimate lens and emitted as a parallel light flux to the galvanometer mirror 22.

The galvanometer mirror 22 reflects (deflects) the laser beam emitted from the laser unit 21 to scan in the main scanning direction X with a reflection mirror (deflection surface) which oscillates sinusoidally in a reciprocating manner.

The galvanometer mirror 22 is known and has the configuration (not shown) in which a silicon substrate is disposed between the opposed permanent magnets (N-pole and S-pole), that is, in the magnetic field. The silicon substrate is formed with a frame portion, a movable portion including the reflection mirror and a coil pattern, and a spring portion which connects the frame portion and the movable portion and axially supports the movable portion to be able to oscillate. In the galvanometer mirror 22 configured in this manner, the movable portion is reciprocated and oscillated in sinusoidal manner around the spring portion as the axis by controlling the direction of current to flow through the coil pattern. Accordingly, the laser beam reflected by the reflection mirror of the movable portion is scanned in the main scanning direction X. Although the galvanometer mirror 22 is used in this exemplary embodiment, any oscillating mirror may be used in place of the galvanometer mirror 22.

The scanning lenses 23 and 24 are arranged in parallel in the proceeding direction of the laser beam to convert the laser beam deflected by the galvanometer mirror 22 to scan at constant speed over the photosensitive drum 32 and form the image on the photosensitive drum 32. Although two scanning lenses are provided in this exemplary embodiment, only one scanning lens or three or more scanning lenses may be provided, as long as the laser beam is converted to form the image on the photosensitive drum 32 and scan at constant speed.

The reflection mirror 25 changes the proceeding direction of the laser beam so that the laser beam emitted from the scanning lens 24 is applied on the photosensitive drum 32. The lateral size of this reflection mirror 25 is set such that the laser beam is applied in an electrostatic latent image formation area on the photosensitive drum 32. An area E shown in FIG. 2 corresponds to the electrostatic latent image formation area on the photosensitive drum 32.

The first optical sensor 26 and the second optical sensor 27 detect the laser beam directed to outside areas of the electrostatic latent image formation area of the photosensitive drum 32 in the scanning direction, and generate an electric signal while the laser beam is applied to the photoreceptive surfaces 26A and 27A, which is an example of the detection position of laser beam, and stop generating the electric signal while the laser beam is not applied. The detection result of each optical sensor 26, 27 is outputted to a controller 50 provided within the main body 2.

The photoreceptive surfaces 26A and 27A of the optical sensors 26 and 27 have a fixed width in the scanning direction of the laser beam. Therefore, each optical sensor 26, 27 outputs a pulse signal that rises instantaneously if the laser beam is incident from one end of the photoreceptive surfaces 26A and 27A in the width direction, maintains a rising state while the laser beam is scanning the photoreceptive surfaces 26A and 27A, and instantaneously falls if the laser beam goes out of the photoreceptive surfaces 26A and 27A from the other end of the photoreceptive surfaces 26A and 27A in the width direction and is not applied to the photoreceptive surfaces 26A and 27A.

Since each optical sensor 26, 27 has the identical electrical characteristics (detection characteristic), the pulse signal having the equal pulse width is outputted from each optical sensor 26, 27, if the scanning speed (time) of the laser beam on the photoreceptive surfaces 26A and 27A is equal. Each optical sensor 26, 27 can not determine the scanning direction of laser beam. Using such optical sensors 26 and 27, the costs of components can be reduced, and the manufacturing costs of the light scanning device 20 or the costs of the apparatus itself can be suppressed.

Next, the arrangement of the first optical sensor 26 and the second optical sensor 27 will be described below.

The first optical sensor 26 is disposed at the left side from the area E, more particularly, at the left from the electrostatic latent image formation area on the photosensitive drum 32 and at the back side from the reflection mirror 25 in side view as shown in FIG. 1. The laser beam reflected by the galvanometer mirror 22 to pass through the scanning lenses 23 and 24 is reflected by the left side of the reflection mirror 25 and is incident on the photoreceptive surface 26A of the first optical sensor 26. The first optical sensor 26 is disposed such that a central position on the photoreceptive surface 26A in the scanning direction of laser beam (hereinafter referred to as "a central position of the photoreceptive surface") is located on an image surface S equivalent to the laser beam scanning surface on the photosensitive drum 32 that is an image formation surface (image formation surface of the scanning lens 24) of the laser beam.

In the light scanning device 20, assuming that the laser beam at a certain moment, for example, the laser beam LB reflected by the reflection surface of the galvanometer mirror 22 and applied to the photoreceptive surface 26A (central position) of the first optical sensor 26 were reflected at a reflection position of the reflection mirror 25, the point L1 (laser beam scanning surface) on the surface of the photosensitive drum 32, at which the laser beam LB would be applied, is set as the image formation surface (image formation point) of the laser beam, as shown in FIG. 3. That is, if the central position (point L2) of the photoreceptive surface 26A is located on the image surface S as the image formation surface of the laser beam, it is meant that the optical path length from the point L3 on the reflection surface of the galvanometer mirror 22 to the point L1 and the optical path length from the point L3 to the point L2 are equal to each other.

Herein, the "optical path length" means the geometrical path length of the path of the light beam without considering refractive index of components, such as lens. That is, the optical path length is defined geometrically without considering refractive index.

Further, the "image formation surface" does not mean the image formation surface exactly coincident with the focal point of the scanning lens 24, but means the region (surface) where the laser beam is focused to the extent that an electrostatic latent image can be formed on the photosensitive drum 32. Accordingly, the image formation surface herein has a certain permissible error from the image formation surface exactly coincident with the focal point of the scanning lens 24.

The second optical sensor 27 is disposed at the right side from the area E, more particularly, at the right side (the back side on the drawing sheet of FIG. 1) from the electrostatic latent image formation area on the photosensitive drum 32 and at a right side of the reflection mirror 25 located front from the first optical sensor 26 in side view. That is, the second optical sensor 27 is disposed closer to the galvanometer mirror 22 than the image surface S. The laser beam reflected from the galvanometer mirror 22 to pass through the scanning lenses 23 and 24 is incident on the photoreceptive surface 27A of the second optical sensor 27 at the right side of the reflection mirror 25.

The controller 50 is provided in the main body 2, and connected to the first optical sensor 26 and the second optical sensor 27. The detection result of each optical sensor 26, 27 is inputted from a single input unit into the controller 50. The controller 50 includes a central processing unit (CPU), a random access memory (RAM), a read only memory (ROM) and an input/output circuit (not shown). The controller 50 controls the reciprocating oscillation motion of the galvanometer mirror 22 based on the input from each optical sensor 26, 27 and the program and data stored in the ROM and controls the deflection angle of the reflection mirror for the galvanometer mirror 22 and the write position of electrostatic latent image on the photosensitive drum 32. Since such controller 50 is known, detailed explanation thereof is omitted. The controller 50 may be provided in the light scanning device 20.

According to the above-described configuration, the following effects can be obtained in this exemplary embodiment.

Since the first optical sensor 26 is disposed on the image surface S, and the second optical sensor 27 is disposed closer to the galvanometer mirror 22 than the image surface S, the optical path length from the galvanometer mirror 22 to the second optical sensor 27 (a central position of the photoreceptive surface 27A) is shorter than the optical path length from the galvanometer mirror 22 to the first optical sensor 26 (central position of the photoreceptive surface 26A).

If the optical path length is shorter, the scanning speed of the second optical sensor 27 scanning the laser beam over the photoreceptive surface 27A is slower than the scanning speed of the first optical sensor 26 scanning the laser beam over the photoreceptive surface 26A, whereby the time for which the laser beam passes through the photoreceptive surface 27A is longer than the time for which the laser beam passes through the photoreceptive surface 26A. Accordingly, since the pulse width of the pulse signal outputted from the second optical sensor 27 is longer than the pulse width of the pulse signal outputted from the first optical sensor 26, the output pulse signals are different from each other even if each optical sensor 26, 27 has identical electrical characteristics.

In the controller 50 of this exemplary embodiment, although the detection result of each optical sensor 26, 27 is inputted from the single input unit, it is possible to determine by which one of the optical sensors 26, 27 a pulse signal is detected since the pulse signals outputted from the optical sensor 26, 27 are different from each other Accordingly, since the scanning direction of the laser beam can be determined, the deflection angle of the reflection mirror for the galvanometer mirror 22 or the write position of the electrostatic latent image on the photosensitive drum 32 can be appropriately controlled.

For example, if a signal having a long pulse width is inputted, the controller 50 can determine that the scanning direction of the laser beam is from right to left in FIG. 2 since the laser beam is detected by the second optical sensor 27. Also, if a signal having a short pulse width is inputted, the controller 50 can determine that the scanning direction of the laser beam is from left to right in FIG. 2 since the laser beam is detected by the first optical sensor 26. Based on this, the controller 50 can control the deflection angle of the reflection mirror for the galvanometer mirror 22 or the write position of the electrostatic latent image on the photosensitive drum 32.

Also, if the optical path lengths from the galvanometer mirror 22 to the optical sensors 26, 27 are different from each other, the scanning speeds of the laser beam on the photoreceptive surfaces 26A, 27A become different, and the rising times of the pulse signals outputted from the optical sensors 26, 27 become different. Accordingly, it is possible to determine which optical sensor detects the pulse signal from the rising time of the pulse signal. Even if a difference in the output (rising time of the pulse signal) caused by a difference in the scanning speed of the laser beam due to individual specificity in the electrical characteristics of each optical sensor 26, 27 does not remarkably appear, it is possible to clearly determine which optical sensor detects the pulse signal from the difference in the pulse width.

In the laser printer 1 having the light scanning device 20 according to this exemplary embodiment, the output of each optical sensor 26, 27 can be unified on the wiring and inputted into the controller 50, whereby the wiring from each optical sensor 26, 27 to the controller 50 or the configuration of an input circuit for the controller 50 can be simplified. Since the control system can be simplified and reduced in size, the laser printer 1 can be reduced in size. Further, since it is not required to equalize the optical path length from the galvanometer mirror 22 to each optical sensor 26, 27, the design is easier than the related-art printer in which the optical path length from the galvanometer mirror to each optical sensor is equal to each other.

Figure 4:
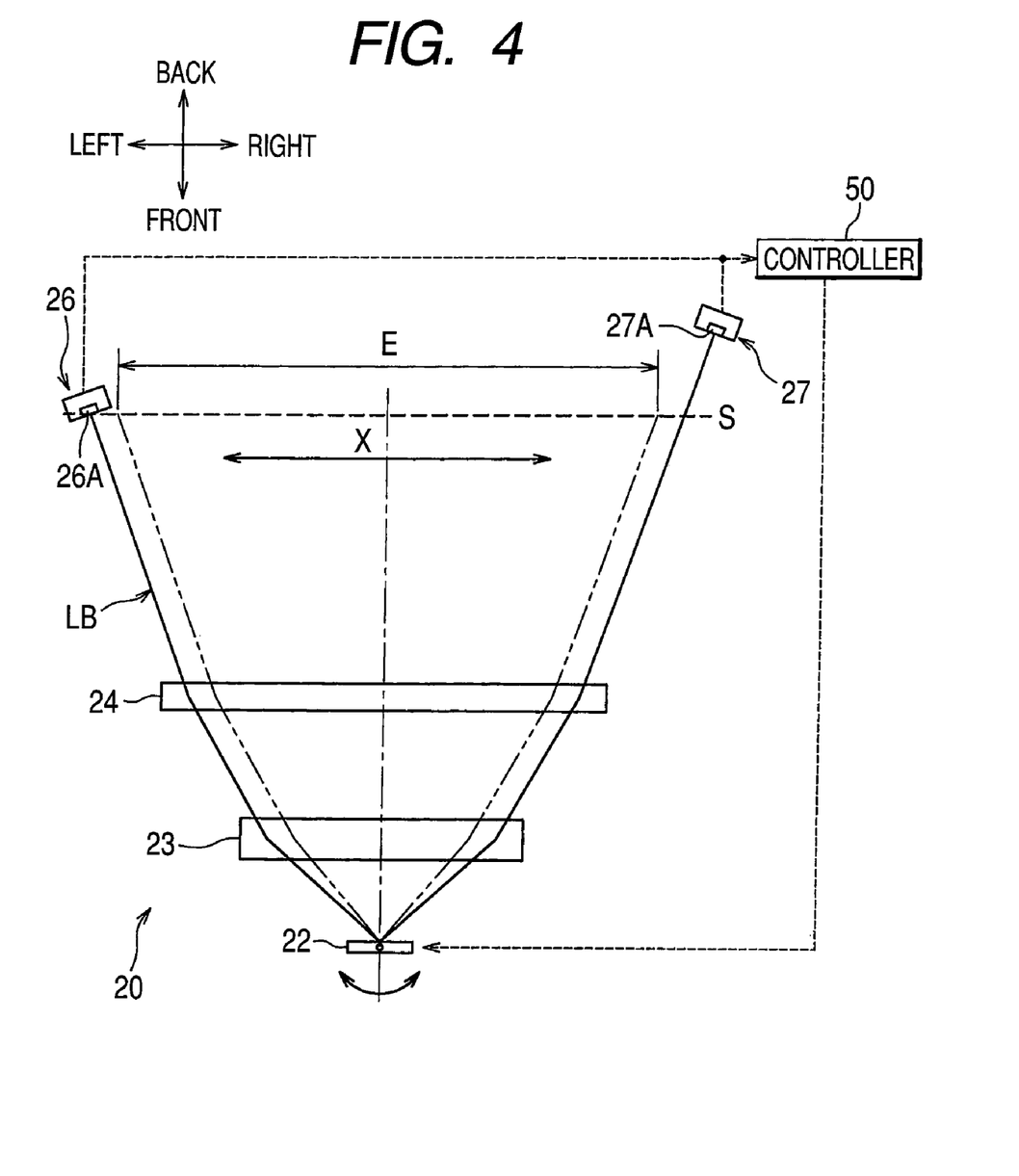
FIG. 4 is a plan view showing the configuration of a light scanning device according to a first modified example of the first exemplary embodiment.
Figure 5:
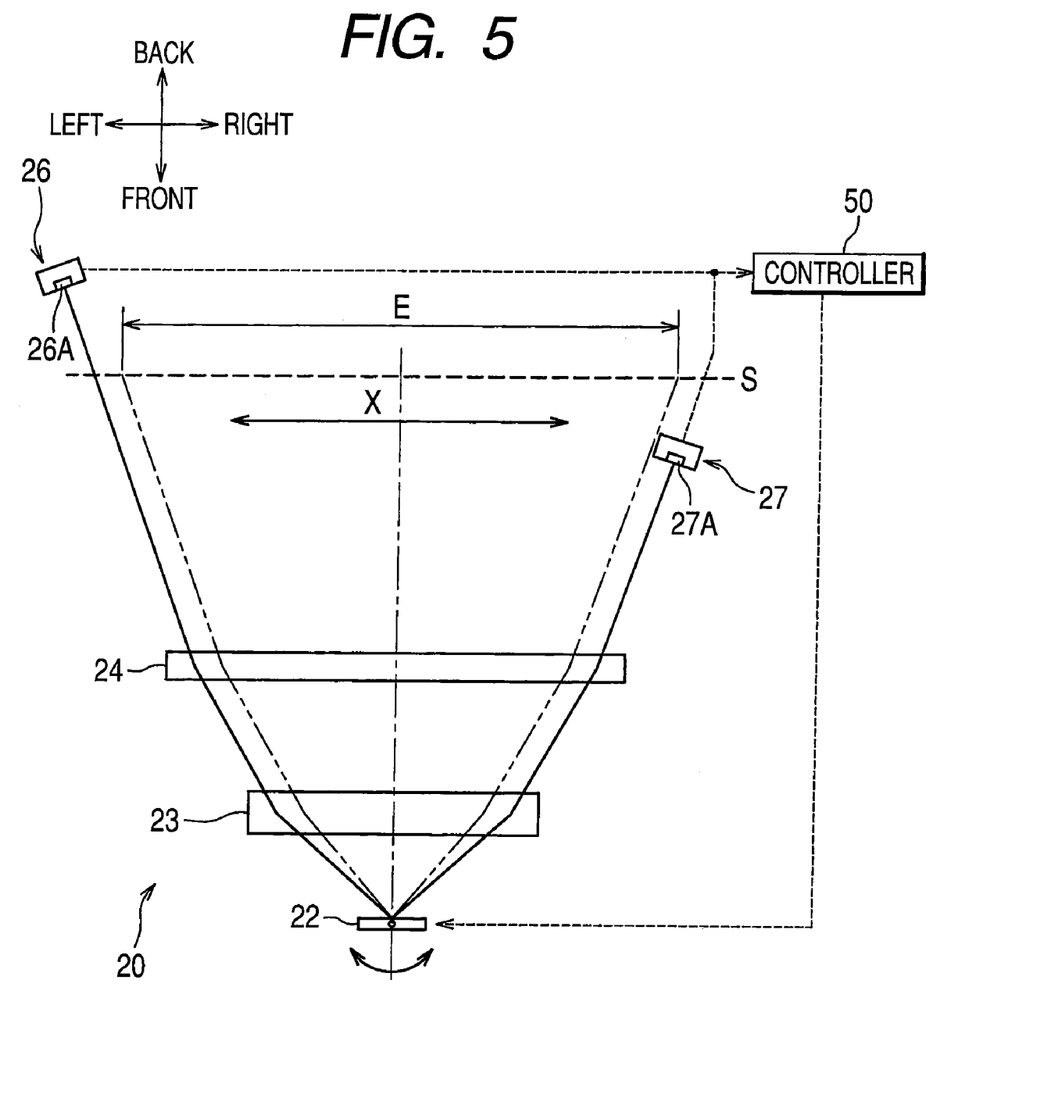
FIG. 5 is a plan view showing the configuration of a light scanning device according to a second modified example of the first exemplary embodiment.

Modified examples of the light scanning device according to the first exemplary embodiment will be described below. FIG. 4 is a plan view showing the configuration of the light scanning device according to a first modified example, and FIG. 5 is a plan view showing the configuration of the light scanning device according to a second modified example.

In the light scanning device 20 according to the first modified example, the second optical sensor 27 (central position of the photoreceptive surface 27A) is disposed farther from the galvanometer mirror 22 than the image surface S, as shown in FIG. 4. Therefore, the optical path length from the galvanometer mirror 22 to the second optical sensor 27 (central position of the photoreceptive surface 27A) is longer than the optical path length from the galvanometer mirror 22 to the first optical sensor 26 (central position of the photoreceptive surface 26A).

Since the scanning speed of the laser beam scanning over the photoreceptive surface 27A is faster than the scanning speed of the laser beam scanning over the photoreceptive surface 26A, the time for which the laser beam passes through the photoreceptive surface 27A is shorter than the time for which the laser beam passes through the photoreceptive surface 26A. Thereby, the pulse width of the pulse signal outputted from the second optical sensor 27 is shorter than the pulse width of the pulse signal outputted from the first optical sensor 26. Accordingly, the pulse signals outputted from the optical sensor 26, 27 are different from each other.

The central position of the photoreceptive surface 27A of the second optical sensor 27 may be disposed on the image surface S, and the central position of the photoreceptive surface 26A of the first optical sensor 26 may be disposed closer or farther than the image surface S with respect to the galvanometer mirror 22.

In the light scanning device 20 according to the second modified example, each optical sensor 26, 27 (central position of the photoreceptive surface 26A, 27A) is disposed across the image surface S, as shown in FIG. 5. More particularly, the first optical sensor 26 is disposed farther from the galvanometer mirror 22 than the image surface S, and the second optical sensor 27 is disposed closer to the galvanometer mirror 22 than the image surface S. At this time, it is advantageous that the optical path length from the central position of the photoreceptive surface 26A to the image surface S and the optical path length from the central position of the photoreceptive surface 27A to the image surface S are equal to each other.

With this configuration, the optical path length from the galvanometer mirror 22 to the first optical sensor 26 (central position of the photoreceptive surface 26A) is longer, and the optical path length from the galvanometer mirror 22 to the second optical sensor 27 (central position of the photoreceptive surface 27A) is shorter. Accordingly, the pulse signals outputted from the optical sensors 26, 27 are different from each other.

Since the image surface S is the image formation face of the laser beam as previously described, the optical path lengths from the photoreceptive surfaces 26A, 27A to the image formation face are equal to each other by equalizing the optical path length from the central position of the photoreceptive surface 26A to the image surface S and the optical path length from the central position of the photoreceptive surface 27A to the image surface S. Thereby, a difference in the pulse signals can be produced in a state in which the laser beam is received on the photoreceptive surfaces 26A, 27A of the optical sensors 26, 27 while the imaging condition of the laser beam is the almost same.

Second Exemplary Embodiment

A second exemplary embodiment of the present invention will be described below in detail with reference to the drawings. In this exemplary embodiment, a part of the configuration of the light scanning device 20 according to the first exemplary embodiment is changed, or more particularly the optical sensor is disposed at only one position. Accordingly, the similar parts as in the first exemplary embodiment are designated by the same numerals, and the explanation is omitted. In the drawings for reference, FIG. 6 is a plan view showing the configuration of a light scanning device according to the second exemplary embodiment.

Figure 6:
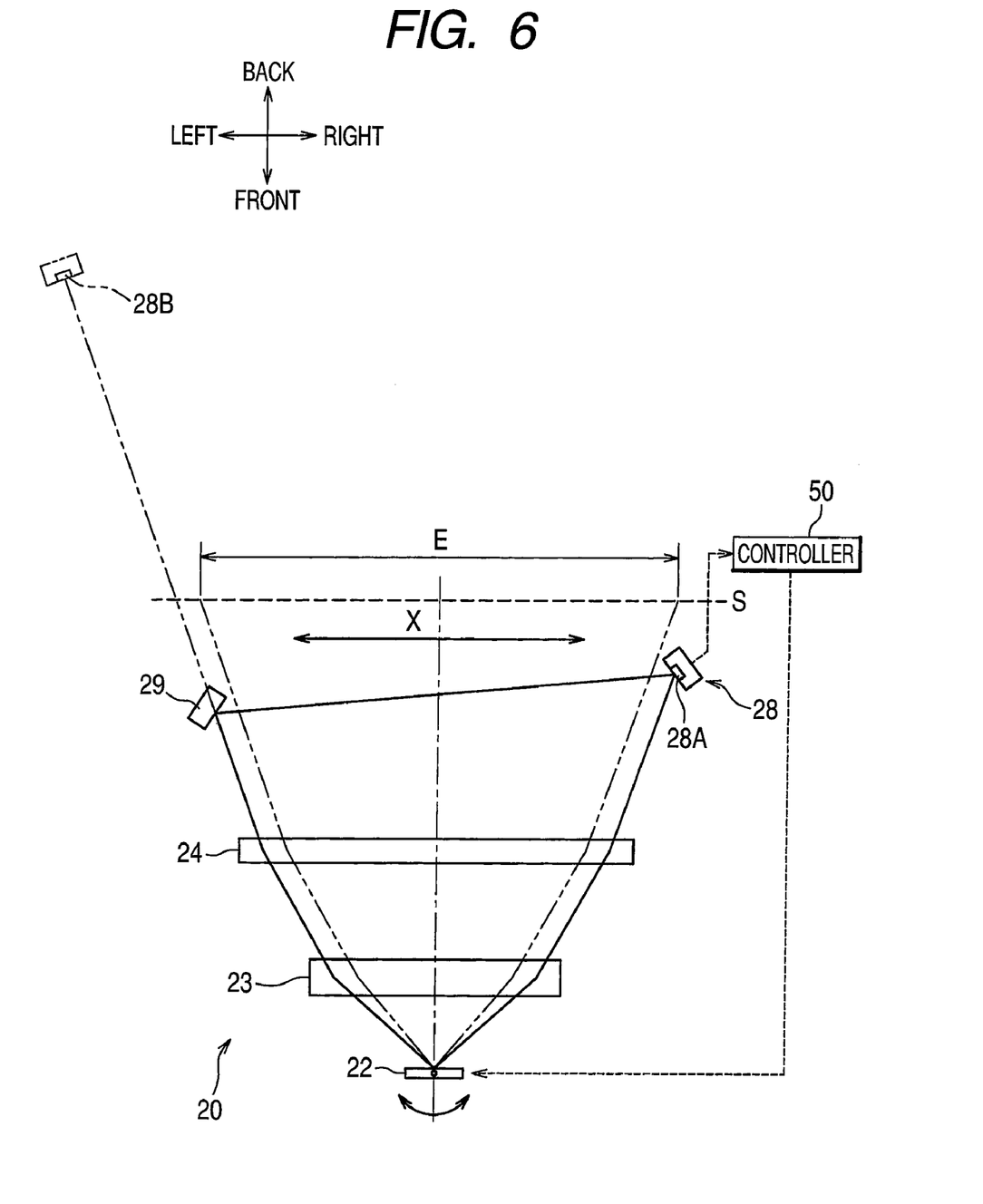
FIG. 6 is a plan view showing the configuration of a light scanning device according to a second exemplary embodiment.

The light scanning device 20 according to the second exemplary embodiment includes a laser unit 21 (see FIG. 1), the galvanometer mirror 22, the scanning lenses 23 and 24, the reflection mirrors 25 (see FIG. 1) and 29, and an optical sensor 28, as shown in FIG. 6. A controller 50 is provided within the main body 2, and connected to the optical sensor 28.

The optical sensor 28, which is the same as the first optical sensor 26 and the second optical sensor 27 as previously described, generates an electric signal (pulse signal) if the laser beam is applied on the photoreceptive surface 28A, and stops generating the electric signal if the laser beam is not applied. A detection result of the optical sensor 28 is outputted to the controller 50.

In the optical sensor 28, the central position of the photoreceptive surface 28A is located at the same position as the second optical sensor 27 (see FIG. 2) according to the first exemplary embodiment, namely, at the right side of the reflection mirror 25. The laser beam reflected from the galvanometer mirror 22 to pass through the scanning lenses 23 and 24 toward the outer right side are of the area E is directly incident on the photoreceptive surface 28A of the optical sensor 28 at the right side of the reflection mirror 25.

The reflection mirror 29 reflects the laser beam reflected from the galvanometer mirror 22 to pass through the scanning lenses 23 and 24 toward the outer left side of the area E, and changes the proceeding direction of the laser beam to be incident on the photoreceptive surface 28A of the optical sensor 28. The optical sensor 28 is disposed so that the photoreceptive surface 28A is oriented in the proper direction (to the front left side in FIG. 6) to appropriately detect the laser beam directed toward the outer right side of the area E and the laser beam directed toward the outer left side of the area E and reflected from the reflection mirror 29. In this case, the central position of the photoreceptive surface 28A is the same position as the second optical sensor 27 as shown in FIG. 2.

In the light scanning device 20 of this exemplary embodiment, the detection position (photoreceptive surface 28A) of the laser beam led from the right outside are of the area E to the optical sensor 28 and the detection position (imaginary photoreceptive surface 28B) of the laser beam led from the left outside area of the area E to the optical sensor 28 have the relationship in which one detection position (photoreceptive surface 28A) is closer to the galvanometer mirror 22 than the image surface S and the other (imaginary photoreceptive surface 28B) is farther from the galvanometer mirror 22 than the image surface S, as shown in FIG. 6.

Herein, the laser beam directed toward the left outside are of the area E is reflected from the reflection mirror 29 to be incident on the photoreceptive surface 28A, which is optically equivalent to the fact that the laser beam is incident on the imaginary photoreceptive surface 28B to which the optical path length from the reflection surface of the reflection mirror 29 is equal to the optical path length from the reflection surface of the reflection mirror 29 to the receptive surface 28A. Accordingly, the photoreceptive surface 28A of the laser beam directed toward the left outside area of the area E is farther from the galvanometer mirror 22 than the image surface S.

According to the above-described configuration, the following effects are obtained in this exemplary embodiment.

Since the laser beam directed toward the right outside area of the area E is directly incident on the photoreceptive surface 28A, and the laser beam directed toward the left outside area of the area E is reflected from the reflection mirror 29 and then incident on the photoreceptive surface 28A, the optical path length from the galvanometer mirror 22 to the optical sensor 28 is differ from each other. More particularly, the optical path length of the laser beam reflected from the reflection mirror 29 on the left side of the area E and led to the optical sensor 28 (hereinafter referred to as the "laser beam led from the left side") from the galvanometer mirror 22 to the optical sensor 28 is longer than the optical path length of the laser beam led from the right outside area of the area E to the optical sensor 28 (hereinafter for the convenience sake of explanation, referred to as the "laser beam led from the right side") from the galvanometer mirror 22 to the optical sensor 28.

Since the optical path length is longer, the scanning speed of the laser beam led from the left side is faster than the scanning speed of the laser beam led from the right side, whereby the time for which the laser beam led from the left side passes through the photoreceptive surface 28A is shorter than the time for which the laser beam led from the right side passes through the photoreceptive surface 28A. Thereby, since the pulse width of the pulse signal outputted in receiving the laser beam led from the left side is shorter than the pulse width of the pulse signal outputted in receiving the laser beam led from the right side, the output pulse signals are different from each other even if only one optical sensor 28 is provided.

Since the pulse signals outputted from one optical sensor 28 have the difference, it is possible to determine which one of the right and left outside areas of the area E a laser beam causing a pulse signal is incident on. Accordingly, since the scanning direction of the laser beam can be determined, the deflection angle of the reflection mirror for the galvanometer mirror 22 or the write position of the electrostatic latent image on the photosensitive drum 32 can be appropriately controlled.

For example, if a signal having a long pulse width is inputted, the controller 50 can determine that the scanning direction of the laser beam is from right to left in FIG. 6 since the laser beam directed toward the right outside area of the area E is detected. Also, if a signal having a short pulse width is inputted, the controller 50 can determine that the scanning direction of the laser beam is from left to right in FIG. 6 since the laser beam directed toward the left outside area of the area E is detected. Based on this, the controller 50 can control the deflection angle of the reflection mirror for the galvanometer mirror 22 or the write position of the electrostatic latent image on the photosensitive drum 32.

Also, since the optical path length of the laser beam led from the right side from the galvanometer mirror 22 to the optical sensor 28 is different from the optical path length of the laser beam led from the left side from the galvanometer mirror 22 to the optical sensor 28, the scanning speed of the laser beam on the photoreceptive surface 28A of the optical sensor 28 is different. Thereby, in this exemplary embodiment, the rising time of the output pulse signal becomes different. Accordingly, it is possible to determine which one of the right and left outside areas of the area E a laser beam causing a pulse signal is incident on, from the rising time of the pulse signal.

Since the laser printer 1 having the light scanning device 20 of this exemplary embodiment has only one optical sensor, the wiring from the optical sensor 28 to the controller 50 or the configuration of the input circuit for the controller 50 can be simplified. Since the control system can be simplified and reduced in size, the laser printer 1 can be reduced in size. Further, since only one optical sensor is required, the costs of components can be suppressed, and the manufacturing costs of the light scanning device 20 and the laser printer 1 or the costs of the apparatus itself can be suppressed.

If the optical path length of the laser beam led from the left side from the galvanometer mirror 22 to the optical sensor 28 (imaginary photoreceptive surface 28B) is greatly different from the optical path length from the galvanometer mirror 22 to the image surface S, one or more lenses for focusing the laser beam on the photoreceptive surface 28A (imaginary photoreceptive surface 28B) may be disposed on the optical path, separately from the scanning lenses 23 and 24. Thereby, since the laser beam focused on the photoreceptive surface 28A (imaginary photoreceptive surface 28B) can be scanned, the laser beam can be detected more accurately.

In this exemplary embodiment, the optical sensor 28 may be disposed on the left side of FIG. 6 and the reflection mirror 29 may be disposed on the right side of FIG. 6. That is, the laser beam led not from the left side, but from the right side, may be reflected from the reflection mirror 29 to be incident on the optical sensor 28. Also, the central position of the photoreceptive surface 28A of the optical sensor 28 may be disposed on the image surface S, or farther from the galvanometer mirror 22 than the image surface S.

While the present invention has been shown and described with reference to certain exemplary embodiments thereof, it will be understood by those skilled in the art that various changes in form and details may be made therein without departing from the spirit and scope of the invention as defined by the appended claims.

For example, although the laser printer 1 has been described in the above exemplary embodiments, the inventive concept of the present invention can be applied to a copying machine or a multi function device.

Although the optical sensors 26 to 28 for outputting the difference in the optical path length of the incident laser beam from the galvanometer mirror 22 to the optical sensor (photoreceptive surface) as the difference in the pulse width or the rising time of the pulse signal is employed, the present invention is not limited thereto. That is, the inventive concept of the present invention can be appropriately employed if the output electrical signal is different depending on the difference in the optical path length of the led light beam from a galvanometer mirror to a light detection sensor.

Although the first optical sensor 26 (central position of the photosensitive surface 26A) is disposed on the image surface S on the back left side of the reflection mirror 25 in the above exemplary embodiments, the arrangement position of the first optical sensor 26 is not limited thereto. That is, if a point has the optical path length from the point L3, which is equal to the optical path length from the point L3 to the point L1, the point can be thought as being located on the image surface S, as shown in FIG. 3, whereby the arrangement position of the first optical sensor 26 may not be on the same plane (point L2) from the point L3 to the point L4. For example, it may be at the point L5 above the laser beam LB, or the point L6 under the laser beam LB. At this time, the optical path length from point L3 to point L5 (or L6) and the optical path length from point L3 to point L1 are equal to each other. If the first optical sensor 26 is disposed at point L5 or L6, the reflection mirror may be appropriately disposed to change the proceeding direction of the laser beam LB and lead the laser beam to the photoreceptive surface 26A. Thereby, since the arrangement of the optical sensor has a greater degree of freedom, the light scanning device or the image forming apparatus can be reduced in size, and their design can be facilitated. The change of the arrangement position may be similarly made for the second optical sensor 27 and the optical sensor 28.

What is claimed is:

1. An image forming apparatus comprising:
a photosensitive body having an image formation area thereon;
a light emitting unit configured to emit a light beam;
a light deflecting unit including an oscillating mirror configured to oscillate in a reciprocating manner to deflect the light beam to scan in a scanning direction;
a scanning lens configured to focus the light beam deflected and scanned by the light deflecting unit on the photosensitive body to form an electrostatic latent image in the image formation area;
a light detecting unit which is provided at a single position and configured to detect the light beam directed to outside areas of the image formation area in the scanning direction and output a detection signal;
a controller configured to determine a scanning direction of the light beam based on the detection signal;
a developing unit configured to supply developer to the electrostatic latent image to form a developer image;
a transfer unit configured to transfer the developer image onto a recording sheet;
a fixing unit configured to fix the developer image transferred onto the recording sheet,
wherein an optical path length of the light beam directed to one of the outside areas, from the light deflecting unit to the light detecting unit is different from an optical path length of the light beam directed to another one of the outside areas, from the light deflecting unit to the light detecting unit,
wherein one of a detecting position of the light detecting unit for the light beam directed to the one of the outside areas in an optical path thereof and a detecting position of the light detecting unit for the light beam directed to the other one of the outside areas in an optical path thereof is located closer to the light deflecting unit than an image formation surface of the scanning lens by a first length, and
wherein the other one of the detecting positions is located farther from the light deflecting unit than the image formation surface of the scanning lens by a second length equal to the first length.

2. The light scanning device according to claim 1, wherein the optical path length is defined geometrically without considering refractive index.

3. An image forming apparatus comprising:
- a photosensitive body having an image formation area thereon;
- a light emitting unit configured to emit a light beam;
- a light deflecting unit including an oscillating mirror configured to oscillate in a reciprocating manner to deflect the light beam to scan in a scanning direction;
- a scanning lens configured to focus the light beam deflected and scanned by the light deflecting unit on the photosensitive body to form an electrostatic latent image in the image formation area;
- a light detecting unit which is provided at a single position and configured to detect the light beam directed to outside areas of the image formation area in the scanning direction and output a detection signal;
- a controller configured to determine a scanning direction of the light beam based on the detection signal;
- a developing unit configured to supply developer to the electrostatic latent image to form a developer image;
- a transfer unit configured to transfer the developer image onto a recording sheet;
- a fixing unit configured to fix the developer image transferred onto the recording sheet,
- wherein an optical path length of the light beam directed to one of the outside areas, from the light deflecting unit to the light detecting unit is different from an optical path length of the light beam directed to the other one of the outside areas, from the light deflecting unit to the light detecting unit,
- wherein one of a detecting position of the light detecting unit for the light beam directed to the one of the outside areas in an optical path thereof and a detecting position of the light detecting unit for the light beam directed to the other one of the outside areas in an optical path thereof is located on an image formation surface of the scanning lens, and
- wherein the other one of the detecting positions is located closer to or farther from the light deflecting unit than the image formation surface of the scanning lens.

* * * * *